(12) United States Patent
Bae et al.

(10) Patent No.: US 6,249,321 B1
(45) Date of Patent: Jun. 19, 2001

(54) DEVICE AND METHOD FOR CORRECTING COLOR DISTORTION ON TV RECEIVER

(75) Inventors: Kuk Ho Bae; Woo Jin Song, both of Kyoungsang buk-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/026,977

(22) Filed: Feb. 20, 1998

(30) Foreign Application Priority Data

Feb. 21, 1997 (KR) ........................................... 97-5294

(51) Int. Cl.[7] ...................................................... H04N 5/21
(52) U.S. Cl. ........................ 348/614; 348/624; 348/617; 348/612; 348/607
(58) Field of Search ................................. 348/624, 614, 348/617, 621, 607, 611, 608, 612, 21; 358/167; H04N 5/21, 5/213

(56) References Cited

U.S. PATENT DOCUMENTS

| | | | |
|---|---|---|---|
| 4,047,224 | * 9/1977 | Yamaguti | 358/166 |
| 4,424,533 | * 1/1984 | Rzeszewski | 358/167 |
| 4,434,438 | * 2/1984 | Rzeszewski | 358/167 |
| 4,947,252 | * 8/1990 | Kobayashi et al. | 358/167 |
| 5,170,260 | * 12/1992 | Tabata | 358/167 |
| 5,177,611 | * 1/1993 | Gibson et al. | 358/167 |
| 5,184,221 | * 2/1993 | Nishi et al. | 348/614 |
| 5,253,063 | * 10/1993 | Ebibara et al. | 358/167 |
| 5,285,280 | * 2/1994 | Teng et al. | 368/614 |
| 5,341,177 | * 8/1994 | Roy et al. | 348/614 |
| 5,343,253 | * 8/1994 | Nishi | 358/614 |
| 5,345,273 | * 9/1994 | Sun | 348/607 |
| 5,361,102 | * 11/1994 | Roy et al. | 348/611 |
| 5,363,144 | * 11/1994 | Park | 348/614 |
| 5,363,145 | * 11/1994 | Go | 348/614 |
| 5,386,243 | * 1/1995 | Huang et al. | 348/607 |
| 5,389,977 | * 2/1995 | Lee | 348/614 |
| 5,619,278 | * 4/1997 | Hill | 348/614 |
| 5,973,752 | * 10/1999 | Matsunaga | 348/614 |

* cited by examiner

*Primary Examiner*—Reinhard J. Eisenzopf
*Assistant Examiner*—Jean W. Désir
(74) *Attorney, Agent, or Firm*—Birch,Stewart, Kolasch & Birch, LLP

(57) ABSTRACT

Device and method for correcting a color distortion on a TV receiver, is disclosed, the method including a multi-path channel estimation step wherein a transmission channel existing between a transmitted side in a broadcasting station and a color demodulating circuit in a TV receiver is estimated for obtaining an impulse response using a reference signal transmitted from the broadcasting station for equalizing a multi-path channel, a color subcarrier phase error calculation step wherein a phase error of a color subcarrier between the transmitter side of the broadcasting station and the TV receiver is calculated using the estimated impulse response, and a phase correction of a reproduced color subcarrier step wherein a phase error on the TV receiver in reproduction of a color is corrected as much as the phase error obtained in the color subcarrier phase error calculation step.

10 Claims, 11 Drawing Sheets

DEVICE AND METHOD FOR CORRECTING COLOR DISTORTION ON TV RECEIVER

BACKGROUND OF THE INVENTION

1. The Field of the Invention

The present invention is related to device and method for correcting a color distortion on a TV receiver, which can prevent a color distortion generated in reproduction of a color.

2. Description of the Related Art

FIG. 1 illustrates general transmission paths of a broadcasting signal, referring to which a process of a TV broadcasting signal transmission will be explained.

The TV broadcasting signal may be transmitted to a TV receiver 14 at a reception antenna 14A, taking both a direct path C1 and indirect path C2 and C3, such as a mountain 12 and a large building 13. A channel with plural broadcasting signal transmission paths is called a multi-path channel. Since a field intensity of the broadcasting signal received at the TV receiver 14 through the direct path C1 is high, the broadcasting signal is displayed on a screen bright and clear, while a field intensity of the broadcasting signal received at the TV receiver 14 through the indirect path C2 or C3, i.e., a ghost, is low, the broadcasting signal is displayed on a screen hazy. The ghost in an actual broadcasting channel appears, not only as a difference of brightness simply, but also various forms, such as a color distortion and an orthogonal distortion. 14B shown on the TV screen is a normal image, and 14C is a ghost. The ghost can be expressed with three parameters of a delay time, an attenuation constant, and a phase shift. The time delay, a parameter for representing a reception time difference of the broadcasting signal depending on a difference of path distances, is represented in a relative time difference of signal arrival with reference to a signal received through a main path in $\mu$sec units. A ghost with a delay time less than "0" is called a full ghost, and a ghost with a little delay time compared to the main signal is called a near ghost. The near ghost in general is a ghost occurred near the main signal with 1~2 $\mu$sec. and most of the ghosts we see in general ambient are these type of ghosts. The attenuation constant represents a degree of intensity of a signal through an indirect path with respect to a signal through a main path, i.e., an intensity of a signal compared to the main path. Phases of signal carriers through different paths in the multi-oath channel differ from a phase of a main path signal carrier, which is represented as the parameter of phase shift.

As can be known from the ghost parameters, the ghost is dependent on time, broadcasting environment, and broadcasting channel. Conditions of ghost generation vary depending, for example, reflection characteristic changes of reflecting bodies depending on environments, carrier frequencies transmitted from broadcasting stations, and the like, according to which a form of ghost is also changed. Therefore, in order to correct a color distortion coming from the multi-path channel, an adaptive feature is required. The color distortion is caused by a phase shift of a color subcarrier due to a ghost coming from a multi-path channel. As color information is carried on a phase in current TV broadcasting system, the greater the phase difference, the greater the color distortion.

In a study, it is found that the ghosts in general are mostly distributed as near ghosts with 1~2 $\mu$sec delay times, and almost all within delay times between −2$\mu$sec and 20 $\mu$sec. Therefore, a device for correcting a color distortion should be capable of correcting color distortions caused by ghosts with delay times of such a range. Efforts for improving a color degradation caused by the multi-paths in a TV signal transmission have mostly been concentrated on an apparent particular color of color signals. However, these techniques could not correct color distortions generated by the multi-path perfectly. And, recently researches for canceling ghosts generated by the multi-path channel in a more fundamental fashion are already underway, and some of which are available as commercial products.

However, though ghosts are canceled and colors are restored by compensating the multi-path channel characteristic itself, because such ghost canceling means employs a long transverse filter and an exclusive signal processor, it has a limitation in reducing a hardware cost.

Of color signals, because such background art color distortion correcting means are adapted to correct colors with reference to a particular color apparent to eyes, they can not correct the color distortions generated by a multi-path channel, fundamentally.

And, though ghosts are canceled and colors are restored by compensating the multi-path channel characteristic itself by using a ghost canceling means which can cancel ghosts generated by a multi-path channel recently, because such ghost canceling means employs at long transverse filter and an exclusive signal processor, it has a defect of requiring much hardware cost.

SUMMARY OF THE INVENTION

Accordingly, the present invention is directed to device and method for correcting a color distortion on a TV receiver that substantially obviates one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the method for correcting a color distortion on a TV receiver includes a multi-path channel estimation step wherein a transmission channel existing between a transmitter side in a broadcasting station and a color demodulating circuit in a TV receiver is estimated for obtaining an impulse response using a reference signal transmitted from the broadcasting station for equalizing a multi-path channel, a color subcarrier phase error calculation step wherein a phase error of a color subcarrier between the transmitter side of the broadcasting station and the TV receiver is calculated using the estimated impulse response, and a phase correction of a reproduced color subcarrier step wherein a phase error on the TV receiver in reproduction of a color is corrected as much as the phase error obtained in the color subcarrier phase error calculation step.

In the other aspect of the present invention, there is provided a device for correcting a color distortion on a TV receiver, including a reference signal detecting part for detecting a GCR signal inserted in a video signal received through an antenna, a timing generating part of receiving a synchronizing signal from a synchronization separating part and generating a timing control signal for detecting the GCR signal, a control part for receiving the GCR signal from the reference signal detecting part, calculating a color subcarrier error between a transmitter side in a broadcasting station and a TV receiver caused by multi-paths in a channel, and generating a color signal correcting data as much as the calculated error, and a color signal demodulating part for receiving the correcting data from the control part and correcting a color signal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Reference will now be made in detail to the preferred embodiments of the present invention, examples of which are illustrated in the accompanying drawings.

A process for estimating a multi-path channel in which an impulse response is obtained by estimating a broadcasting signal transmission channel will be explained.

A signal taken as a reference in estimating a multi-path channel is a GCR, which is a signal on information agreed in advance repeatedly inserted in vertical blanking intervals of a broadcasting signal by a broadcasting station in order to equalize the multi-path channel. It is current trend that standards for the GCR is provided world widely. And, in Korea, a TS-GCR (Ternary Sequence GCR) system proposed in 1992 is employed as a standard by the Korean Broadcasting Corporation (KBS), has been transmitted through the KBS-1 broadcasting channel since 1994, and is also transmitted from the KBS-2broadcasting channel, presently. Of the three GCR signal system recommended by the ITU (International Telecommunication), a method for estimating a multi-path channel using the Korean Standard GCR signal proposed by Korea will be explained as an embodiment.

Figure 1:
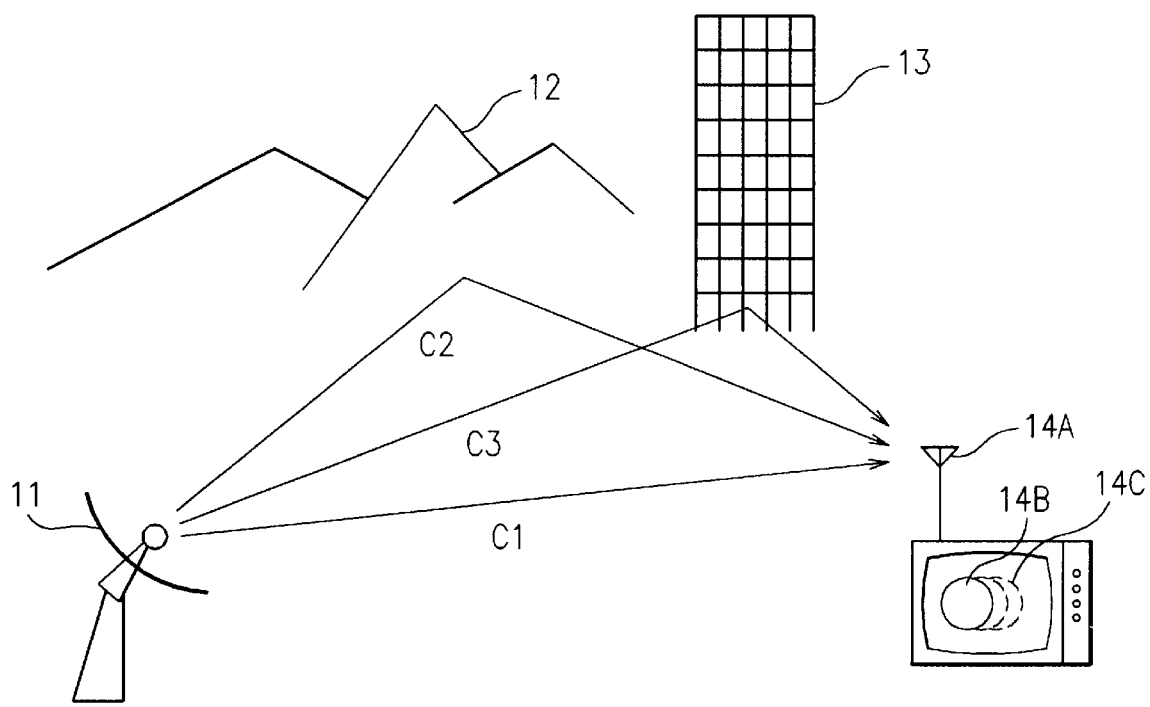
FIG. 1 explains general multiple transmission paths of a TV broadcasting signal.
Figure 2A:
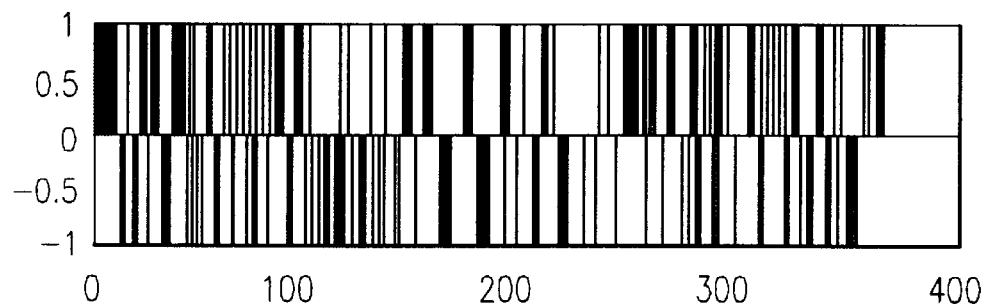
FIG. 2a illustrates a ternary sequence format.
Figure 2B:
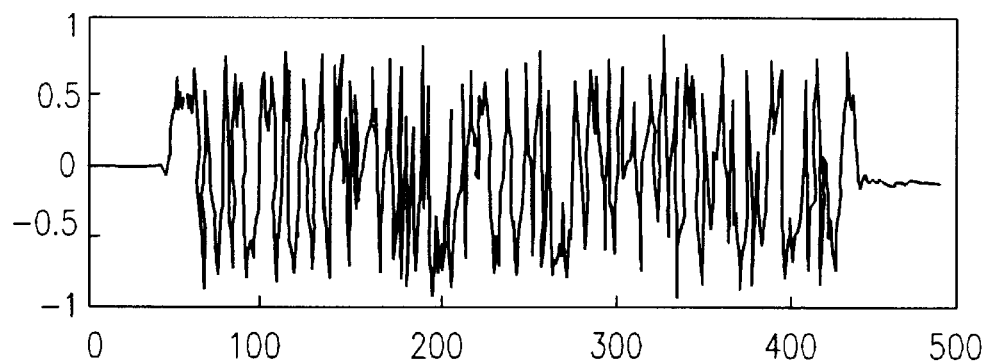
FIG. 2b illustrates a waveform of a GCR (Ghost Cancel Reference) signal.

The Korean Standard GCR signal has a ternary sequence with a length of 366. In the Korean Standard GCR signal, considering that the ternary sequence signal can not be transmitted on a TV channel as it is due to the relatively wide bandwidth of ternary sequence signal, the bandwidth is set restricted so as not to exceed a TV video signal bandwidth (4.3 MHz). FIG. 2a illustrates a waveform of the ternary sequence s[n], and FIG. 2b illustrates a waveform of the GCR signal r[n] having its signal bandwidth restricted by using a low pass filter, which can be expressed as the following equation 1.

$$r[n] = h_L[n] * s[n] = \sum_{m=0}^{88} h_L[m]s[n-m] \tag{1}$$

Where, $h_L[n]$ is an impulse response of the low pass filter for restricting a bandwidth, with a length of 89. The special characteristic of the ternary sequence in which a circular auto correlation becomes an impulse is expressed as the following equation 2.

$$R_{SS} = \sum_{k=0}^{365} s[k]s[((k-n))_{366}] = C_1 \delta[n] \tag{2}$$

Where, $((k-n))_{366}$ is a remainder of a positive numeral after dividing (k−n) with 366, and $C_1$ is a constant having a value 169 equal to a sum of values in the ternary sequence s[n] that are not "0". The device for correcting a color distortion due to a multi-path channel suggested by the present invention utilizes a circular auto correlation in an intention that an amount of calculation is minimized using such a characteristic of the Korean GCR signal. The circular auto correlation between the ternary sequence of the Korean Standard GCR signal shown in FIG. 2b and the bandwidth restricted GCR signal is a follows. First, a circular auto correlation is defined as equation 3 below, and the circular auto correlation can be expressed using equations 2 and 3 as shown in equation 4, below.

$$R_{rs}[n] = \frac{1}{C_1} \sum_{k=0}^{365} r[k]s[((k-n))_{365}] \tag{3}$$

$$R_{rs}[n] = \frac{1}{C_1} \sum_{k=0}^{365} \sum_{m=0}^{88} h_L[m]s[k-m]s[((k-n))_{366}] - \quad (4)$$

$$\frac{1}{C_1} \sum_{m=0}^{88} h_L[m] \sum_{k=0}^{365} s[k-m]s[((k-n))_{366}]$$

$$= \frac{1}{C_1} \sum_{m=0}^{88} h_L[m]C_1\delta[n-m]$$

$$= h_L[n]$$

Figure 3:
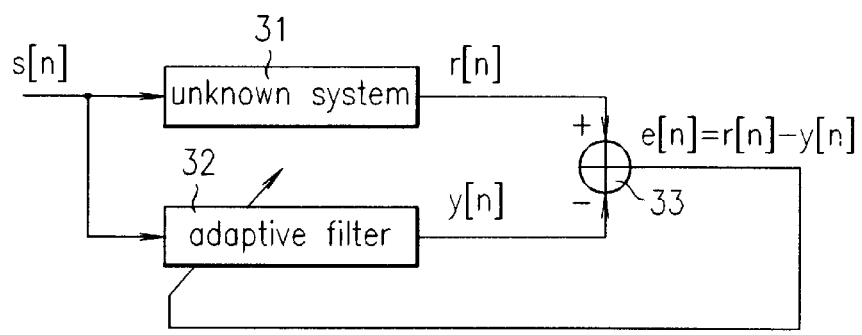
FIG. 3 illustrates a system identification block diagram having an adaptive filter applicable to a device for correcting a color distortion in accordance with a preferred embodiment of the present invention.
Figure 4A:
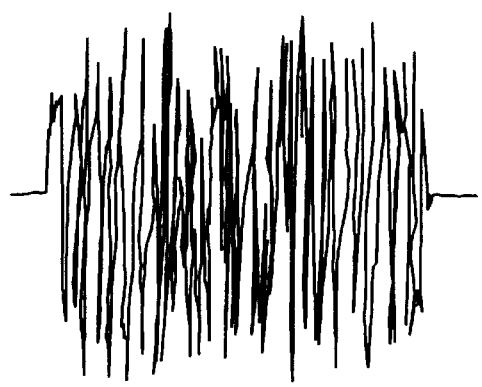
FIG. 4a illustrates a waveform of Korean standard GCR signal r[n]
Figure 4B:
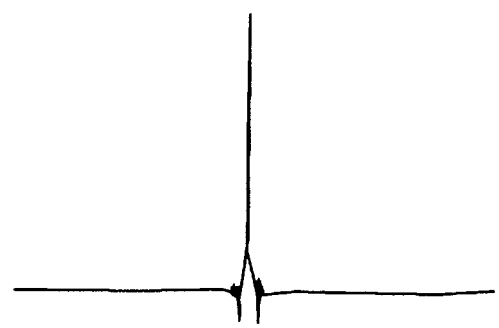
FIG. 4b illustrates an impulse response waveform of a low pass filter.
Figure 4C:
FIG. 4c illustrates an impulse response waveform of an arbitrary multi-path channel.
Figure 4D:
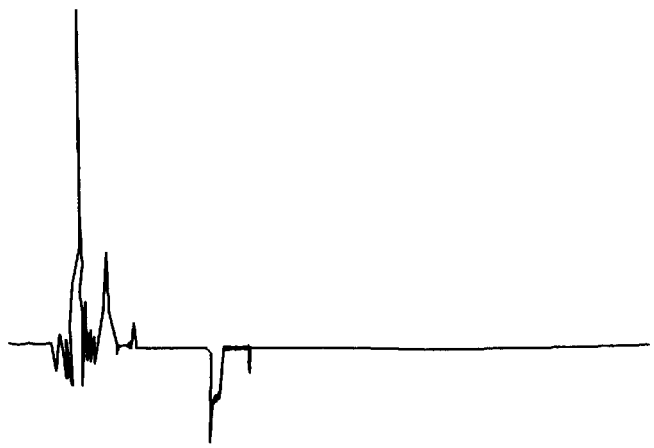
FIG. 4d illustrates a composite impulse response waveform of the waveforms shown in FIGS. 4b and 4e.
Figure 4E:
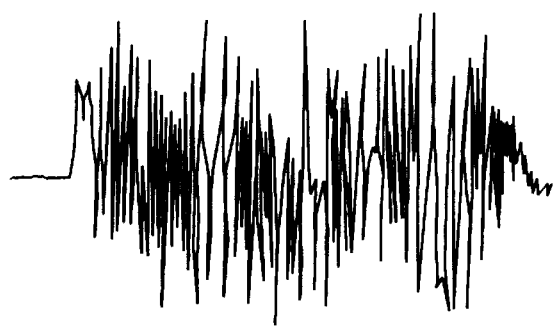
FIG. 4e illustrates a waveform of received GCR signal r[n]
Figure 4F:
FIG. 4f illustrates a waveform of an impulse response hc[bn] of a calculated multi-path channel.

Where, as in equation 1, r[n] is a signal obtained by passing s[n] through a low pass filter $h_L$[n]. Therefore, as a result of obtaining a circular auto correlation of the r[n] and s[u], a system can be known, passing through which the s[n] altered into r[n]. That is, as shown in FIG. 3, if a s[n] is provided to an unknown system 31 and an operation is conducted in which a circular auto correlation as equation 3 is obtained using a signal r[n] provided from the known system 31, an impulse response to the known system 31 can be obtained. And, as a ternary sequence s[n] consists of –1, 0, 1, equation 3 allows to obtain an impulse response of an arbitrary multi-path channel by a circular auto correlation calculation using an adder 33.

As embodiments of such multi-path channel estimation methods, there are the adaptive system identification method and the circular cross-correlation method. In the circular cross-correlation method, a GCR signal passed through a multi-path channel and received at a TV receiver can be expressed as equation 5, below.

$$r_R[n] = n[n] * r[n] + w[n] \quad (5)$$

$$= \sum_{l=0}^{L} u[l]r[n-l] + w[n]$$

$$= \sum_{l=0}^{L} h[l] \sum_{m=0}^{88} h_L[m]s[n-l-m] + w[n]$$

Where, h[n] is an impulse response of a multi-path channel from a transmitting terminal of a broadcasting station to a device for correcting a color distortion on a TV receiver, L is a length of h[n], s[n] is a ternary sequence, r[n] is an original GCR signal of which ternary sequence s[n] has been bandwidth restricted, and w[n] is a noise mixed in the transmission process.

It is known that an impulse response of an unknown system can be obtained by obtaining a circular auto correlation of a Korean Standard GCR signal characteristic by using equation 4. In order to obtain an impulse response of a multi-path channel using a received GCR signal $r_R$[n] in an identical method, a circular auto correlation of the $r_R$[n] and s[n] is obtained by an equation shown below.

$$h_c[n] = \frac{1}{C_1} \sum_{k=0}^{K} r_R[n]x[((k-n))_{366}] \quad (6)$$

Where, K denotes a length of a received GCR signal $r_R$[n] which is substituted by equation 5 to obtain equation 7 shown below.

$$h_c[n] = \frac{1}{C_1} \sum_{k=0}^{K} \sum_{l=0}^{L} h_L[l] \sum_{m=0}^{88} h_L[m]s[k-l-m]s[((k-n))_{366}] + \quad (7)$$

$$\frac{1}{C_1} \sum_{k=0}^{K} w[k]s[((k-n))_{366}]$$

Equation (8) shown below can be obtained from equation (6) when equation (7) is re-arranged, substituting the second term with ws[n]

$$h_c[n] = \frac{1}{C_1} \sum_{l=0}^{L} h[l] \sum_{m=0}^{88} h_L[m] \sum_{k=0}^{K} s[k-l-m]s[((k-n))_{366}] + ws[n] \quad (8)$$

$$= \frac{1}{C_1} \sum_{l=0}^{L} h[l] \sum_{m=0}^{88} h_L[m]\delta[((n-l-m))_{366}] + ws[n]$$

If L+88 is smaller than 366, then equation (8) can be expressed as an equation (9) shown below, more simply $$h_c[n] = \sum_{l=0}^{L} h[l] \sum_{m=0}^{88} h_L[m]\delta[n-l-m] + ws[n] \quad (9)$$

$$= \sum_{l=0}^{L} h[l]h_L[n-l] + ws[n]$$

When the assumption that L+88 is smaller than 366 is examined, because a system clock frequency used in a device for correcting a color distortion is about 14.3 MHz, four times of a color subcarrier frequency, an impulse response time of a multi-path channel with a length of 366 is about 26 μsec, which is within a general ghost delay time of –2 μsec~20 μsec. Therefore, in view of practical use, the assumption that L+88 is smaller than 366 does not cause any probelm. Equation (9) is re-arranged under this assumption to express it more simply as the following equation (10):

$$h_r[n] :: h[n] * h_L[n]^1 ws[n] \quad 0 \leq n < 366 \quad (10)$$

A precise expression of an impulse response hc[n] of a multi-path channel obtained by using a circular auto correlation of a received GCR signal rR[n] distorted by the multi-path channel and a ternary reference, which is a reference signal of the Korean Standard GCR signal, is a composite response of an impulse response $h_L$[n] of a low pass filter for a bandwidth restriction, an impulse response h[n] of a multi-path channel, and an impulse response from a reception terminal on a TV receiver to a GCR capture plus a noise. An impulse response of a multi-path channel used hereafter may represent hc[n] or h[n] depending on the case.

An impulse response hc[n] of a multi-path channel with a length of 366 estimated using equation (6) has a position of a maximum value depending on a position of a sampling reference point for a received GCR signal. This dependence comes from a time error generated in a timing generator for obtaining the GCR signal. This dependence comes from a time error generated in a timing generator for obtaining the GCR signal. Therefore, for compensating the time error in the timing generator, it is necessary to rearrange intervals such that the maximum values of an impulse response of a multi-path channel always fall on a fixed point. For determining the point of maximum value, a range of influence from an existing ghost, which should be taken into consideration, should be determined beforehand. In the present invention, the interval is arranged such that the hc[n] becomes maximum, for compensating a color distortion due to influences of forward ghost and backward ghost existing within a range of $-2\mu sec \sim 20$ $\mu sec$. And, a process for obtaining an average of the received GCR is also necessary for obtaining a response to a multi-path channel using the received GCR signal. To do this, the GCR signals is received at least more than 8 time and averaged, to obtain a hc[n]. This averaging more than 8 time to obtain a hc[n] has been fixed as a standard, with which an influence from a noise can be reduced. An impulse response hc[n] of a multi-path channel calculated only when a transmitter side provides a ternary sequence s[n] precisely exhibits a characteristic of a TV signal transmission path. Therefore, because the impulse response calculated when s[n] is not provided from the transmitter side can not be taken as an impulse response of a multi-path channel, it is necessary to determine whether the impulse response calculated with a signal received from a horizontal interval to which the GCR signal is provided exhibits a characteristic of the TV signal transmission path. In order to determine received signal of containing a GCR signal, presence of the maximum value of an impulse response within the fixed interval should be determined, a sum of the impulse responses should be compared to a reference value, and coefficients exceeding a certain reference value, of the calculated impulse response coefficients should be counted.

FIG. 4 illustrates an example in which an impulse response of a multi-path channel is obtained using equation (8). That is, FIG. 4a is a waveform of an original GCR signal r[n] of which ternary sequence having been bandwidth restricted by a low pass filter. In case the signal is distorted by a multi-path channel h[n] and received at a TV receiver in a form $f_g[n]$ shown in FIG. 4c, though information like FIG. 4c can not be known from the TV receiver, a calculation of equation (6) may be carried out to obtain a calculated impulse response {hc[n]} of the multi-path channel as shown in FIG. 4f. FIG. 4b illustrates a waveform of an impulse response $h_L[n]$ of a low pass filter for restricting a bandwidth of a ternary sequence, and FIG. 4d illustrates a waveform obtained as a result of convolution of an impulse response of a bandwidth restricting filter and a multi-path channel h[n] as shown in FIG. 4c. FIGS. 4d and 4f illustrate waveforms obtained as results of interval alignment such that maximum values are to position at a fixed point.

In the meantime, a process for calculating a phase error of a color subcarrier of the present invention, including calculating a response characteristic of a color subcarrier frequency using the impulse response of a multi-path channel estimated as above, calculating the response characteristic of the color subcarrier frequency using a calculating result, and calculating a phase error of color subcarriers reproduced in a transmitting terminal of a broadcasting station and a TV receiver using the calculated result, will be explained.

As the impulse response hc[n] of a multi-path channel estimated in the aforementioned process is a discrete value, the impulse response hc[n] is subjected to a z-transformation for analyzing a frequency range of the discrete value, to obtain equation (11) shown below.

$$H_c(z) = \sum_{n=\infty}^{\infty} h_c[n]z^{-n} \tag{11}$$

A frequency response equation for equation (11) is expressed as an equation (12) shown below.

$$H_c(e^{jw}) = 11\ (z);\ z - e^{(SG)} \tag{12}$$

What is notable in equation (12) is a phase shift of a color subcarrier which has a frequency fsc or 3.579545 MHZ. If the received GCR signal provided to the deive for correcting a color distortion is sampled in frequencies four times of the fsc, each frequency of the color subcarrier for the sampled frequency can be expressed as equation (13).

$$w = \frac{\pi}{2} \tag{13}$$

Equation (13) may be applied to equation (12) to obtain equation (14).

$$H_c(e^{j\frac{\pi}{2}}) = H_c(Z)|_{z=e^{j\frac{\pi}{2}}} \tag{14}$$
$$= H_c(Z)|_{z=j}$$
$$= \sum_{n=\infty}^{\infty} h_c[n](j)^{-n}$$

Thing which should be taken into account in equation (14) is that, though a range of "n" is set to be , the range should be started from "0" because a response estimated in a multi-path channel shows a characteristic of casual model.

Considering both a range of presence of most ghost in a TV broadcasting channel, which is proved to be $2\mu sec$ to 20 $\mu sec$ and an amount of calculation to be conducted by 4 microprocessor, a range of calculation should be restricted only to a range within which most of ghost is present. Therefore, because the sampling interval is about 70 $\mu sec$ considering that the sampling frequencies are 4 times of the fsc, an impulse response sequence for a channel with about 340 multi-paths is required for processing range. Accordingly, equation 14) can be expressed as equation (15), finally.

$$H_c(e^{j\frac{\pi}{2}}) = \sum_{n=0}^{319} h_c[n](j)^{-n} \tag{15}$$

It can be known that $(j)^{-n}$ in equation (15) may be 1, $-j$, 1, j depending on "n". Real terms and imaginary terms in equation (15) are arranged separately using such a feature, to obtain an equation (16) shown below for a frequency response of a color subcarrier of an estimated multi-path channel.

$$H_c(e^{j\frac{\pi}{2}}) = \left( \sum_{n=4r} h_c[n] - \sum_{n=4r+2} h_c[n] \right) + \tag{16}$$

$$j\left(\sum_{n=4r+1} h_c[n] - \sum_{n=4r+3} h_c[n]\right) \quad (r = 0\ldots 79)$$

If the real term and the imaginary term are defined respectively as;

$$A = \sum_{n=4r} h_c[n] - \sum_{n=4r+2} h_c[n] \tag{17}$$

$$B = \sum_{n=4r-1} h_c[n] - \sum_{n=4r+3} h_c[n]$$

Then, an amplitude response and a phase response of a color subcarrier in a multi-path channel may be expressed as equations 18a and 18b, respectively.

$$|H_c(e^{j\frac{\pi}{2}})| = \sqrt{A^2 - B^2} \tag{18a}$$

$$\angle H_c(e^{j\frac{\pi}{2}}) = \tan^{-1}\frac{B}{A} \tag{18b}$$

As the object of the present invention is to make a color reproduced on a TV receiver to be closer to a color transmitted from the transmitter side by extracting a phase error of a color subcarrier caused by multi-paths within a channel, only equation (18b) is used and a table system is employed for calcualting $\tan^{-1}$ in a microprocessor.

The phase response of a color subcarrier calculated according to equations 18a and 18b is a response by a signal transmission path until a received GCR signal is sampled from a GCR reference signal. The signal transmission path is shown subdivied in FIGS. 5a and 5b.

Figure 5A:
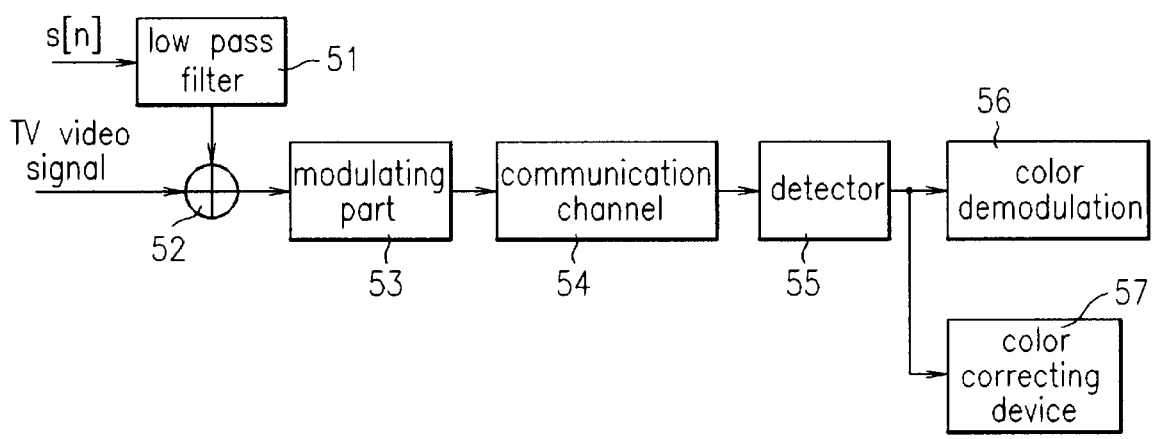
FIGS. 5a and 5b illustrate block diagrams of systems for processing a broadcasting signal.
Figure 5B:
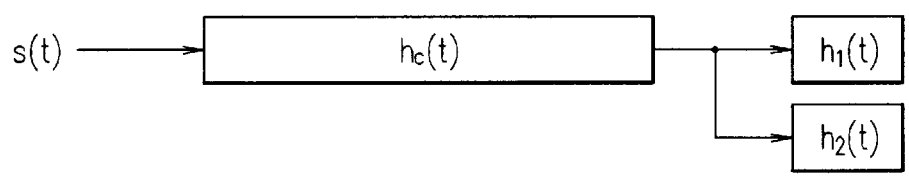

Since an estimated impulse response of a multi-path channel uses a ternary sequence s[n], which is a GCR signal, it is different from a response by a transmission path of a TV video signal as shown in FIG. 5a. Because the phase response of color subcarrier calcualted according to equation 18b can be different from the phase response of color subcarrier of a TV video signal, as the phase response of the low pass filter 51 is added in the adder 52. However, as it can be assumed that actual phase responses of low pass filters used in broadcasting stations are the same, a modulating part 53, communication channel 54, detecting part 55 in a TV receiver after the adder 52 can be considered as a channel. A TV signal detected in a TV receiver undergoes a separate correcting process using a color correcting device for correcting a color distortion caused by a color demodulation process and a multi-path channel. Therefore, an impulse response of a color demodulating circuit denoted as $h_1(t)$ and an impulse response of a color correcting device denoted as $h_{uf}$ can be different. If $\Phi_1$ and $\Phi_2$ are phase responses of color subcarrier of the two impulse responses, a phase difference between the two circuits is expressed as equation (13) below.

$$\Delta\Phi\ \Phi_2 - \Phi_1 \tag{19}$$

And, in the phase response of the color subcarrier by a multi-path channel, a difference of $\Delta\Phi$ should be taken into consideration from a calculation resultant of equation (18b). Accordingly, an actual phase response of a color subcarrier by a multi-path channel calculated through the aforementioned process can be expressed as equation 20, below.

$$\Phi_{sc} - \tan^{-1}\frac{B}{A} - \Delta\Phi \tag{20}$$

Therefore, equation (20) represents a phase error between a color subcarrier at the transmitter side in a broadcasting station and a color subcarrier reproduced on a TV receiver. By providing a phase correcting process for a reproduced color subcarrier in which a color is corrected as much as the phase error in a TV receiver, a color the most closest to a color transmitted from a broadcasting station can be reproduced.

Figure 6:
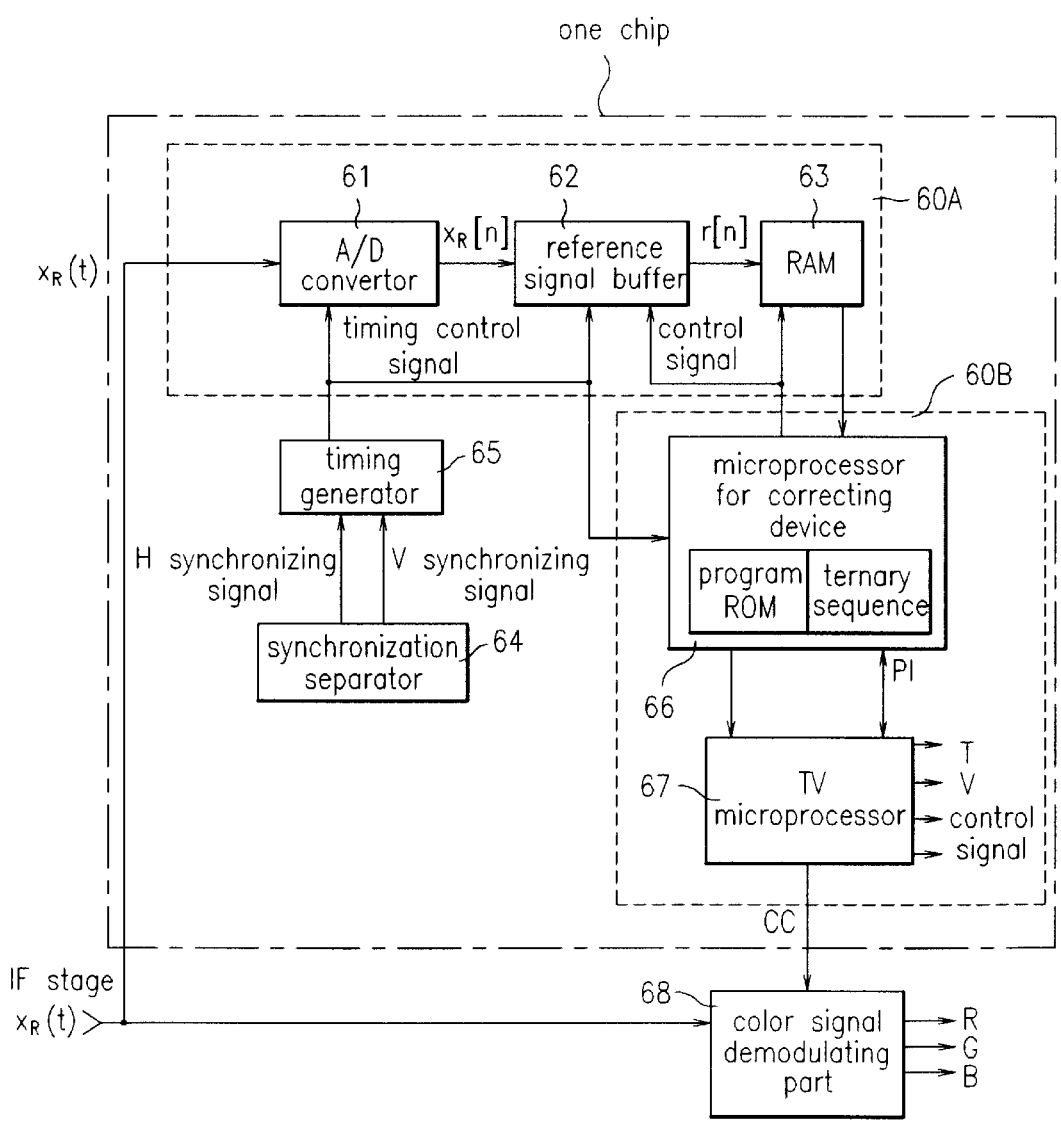
FIG. 6 illustrates a block diagram of a device for correcting a color distortion in a TV receiver in accordance with a preferred embodiment of the present invention.

In the meantime, FIG. 6 illustrates a block diagram showing an embodiment of a device for correcting a color distortion on a TV receiver in accordance with the present invention.

Referring to FIG. 6, the device for correcting a color distortion on a TV receiver in accordance with the present invention includes a reference signal detecting part 60A for detecting a ghost cancel reference signal (GCR) for distortion correction inserted in a received video signal, a timing generator 65 for receiving horizontal, and vertical synchronizing signals H and V from a synchronization separator 64 and generating a timing controlling signal TC required for detecting the GCR signal in the reference signal detecting part 60A, a controlling part 60B for receiving the GCR signal from the reference signal detecting part 60A, calculating a color subcarrier error between at transmitter side in a broadcasting station and a TV receiver caused by a channel with multi-paths and generating a color signal correcting data as much as the calculated error, and a color signal demodulating part 68 for receiving the correcting data from the controlling part 60B and correcting a color signal. In the controlling system 60B, a microprocessor 66 for a correcting device and a microprocessor 68 for a TV are shown separated for the convenience of manufacture, the microprocessor 66 for a correcting device may be included to a microprocessor 67 for controlling a TV as an algorithm carried out by the microprocessor 66 for a correcting device is a simple operation with addition.

The operation of the embodiment of the present invention will be explained, with reference to FIGS. 6 to 9.

Referring to FIG. 6, the synchronization separator 64 separates horizontal, and vertical synchronizing signals from a received TV broadcasting signal $x_R(t)$. The timing generator 65 detects a horizontal interval containing a GCR in a broadcasting signal with reference to the horizontal, and vertical signals, provides a clock signal and a timing signal so that a GCR signal received within the interval is sampled by an A/D converter 61 and stored in a reference signal buffer 62 temporarily, and informs the microprocessor 66 for a correcting device that the GCR signal is being received. The timing generator 65 also provides a system clock, which is a quadruple frequency of a color subcarrier for simplifying a calculation in a signal processing. The GCR stored in the reference signal buffer 62 is provided to a RAM 63 in response to a control signal CONT from the microprocessor 66 for a correcting device. The reference signal buffer 62 may be formed with an FIFO. When the GCR signal is stored in the RAM 63 for a preset times (for example 8 times), the microprocessor 66 for correcting device calculates an average of data stored in the RAM 63 obtains an impulse response of a channel with a multi-paths using adaptive system identification or circular auto correlation, and calculates an influence of the estimated impulse response to the color subcarrier. Upon completion of calculation of the phase error between the two color subcarriers, the microprocessor 66 for correcting device obtains a color correcting data for correcting the error and provides to the TV microprocessor 67 for reflecting the color correcting data to the color demodulating part 68 in the TV receiver according to transmission rule established between the TV microprocessor 67.

Figure 7:
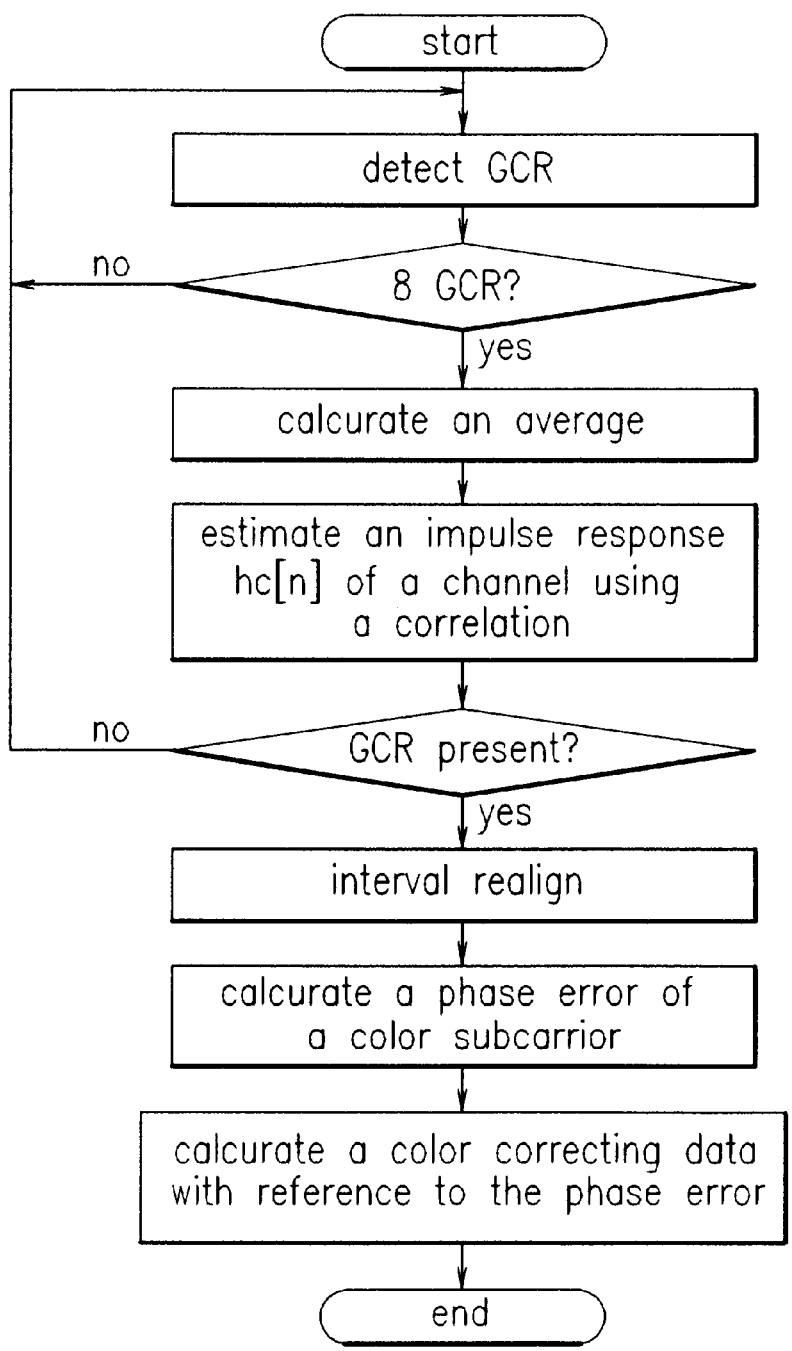
FIG. 7 illustrates a flow chart showing steps of calculating a color distortion correcting value in accordance with a preferred embodiment of the present invention.

FIG. 7 illustrates a flow chart showing a flow of signal in a color distortion correcting value calculator conducted by the microprocessor 66 for correcting device. According to this flow chart, there are three color correcting steps, at large. The first step includes detecting a received GCR signal and storing it in a RAM 63, the second step includes obtaining an average of the GCR to obtain an impulse response for a multi-path channel, and the third step includes calculating a phase error of a color subcarrier due to a multi-path channel to obtain a color correcting data for correcting the error. The GCR detecting step is a process for the RAM 63 to read the GCR signal $r_R[n]$ A/D converted and stored in the reception reference signal buffer 62. To this, the microprocessor 62 for correcting device establishes addresses in the RAM 63 and provides a control signal CONT for input/output of data between the RAM 63 and the reference signal buffer 62. This process is repeated until 8 $r_R[n]$ sequences are received. The average calculating step is a process for averaging the received 8 $r_R[n]$ sequences for improving a signal to noise ratio according to an averaging method specified in a GCR standard. The impulse response estimating step is a process for estimating an impulse response hc[n] of a multi-path channel using a channel estimating method using a circular auto correlation of equation (6) of the GCR signal. Because the impulse response of a multi-path channel is estimated with reference to a ternary sequence transmitted from a transmitter side, the impulse response estimated in the case when the GCR is not contained in a signal from the transmitter side can not be considered that the impulse response reflects a characteristic of the multi-path channel. Therefore, it is necessary to analyze the estimated impulse response of a channel for determining presence of the GCR signal. The GCR determining step carries out this requirement, in which the presence of GCR signal is determined by determining existence of a maximum value in a defined interval, a sum of impulse response coefficients of being greater than a reference or the impulse response coefficient being greater than a reference. And, since an estimated impulse response of a channel has a position of a maximum value changed according to a sampling reference point at reception of the GCR signal changed by the error of the timing generator 65, the interval should be aligned such that the maximum values are always positioned at the same point. This is conducted in the interval re-arranging step. Conducting calculations according to equations (16) to (20) using the estimated impulse response of a multi-path channel, the phase error calculating step calculates the phase error of a color subcarrier using a simple adding operation. Finally, the color correcting data calculating step is a process for obtaining a color correcting data for correcting a color with reference of the calculated phase error. The color correcting data finally calculated according to the aforementioned method, which is a data for controlling the color signal demodulating part 68, is provided to the TV microprocessor 67 according to an established communication rule.

An actual effectiveness of color distortion correction of a TV broadcasting signal, which is caused by a multi-path channel, according to the present invention is evaluated in an experiment as follows. It is considered that the best method for evaluating a color distortion correcting capability of the present invention is a subjective method in which a device for correcting a color is actually manufactured and a ghost generator is used for examining an operation of the device. Accordingly, the effectiveness of the present invention will be examined based on a computer simulation. The microprocessor in the correcting device is a 8-bit microporocesor used in a general TV receiver. To make the color correcting device to work normally, the impulse response of a multipath channel should be estimated, accurately. There is no way of knowing the information on a channel required for determination of the accurate estimation of the channel impulse response. Therefore, in an experiment for estimating a channel, a GCR signal transmitted from KBS-1 and KBS-2 of Korea is used for reading an average of GCR signals and a calculated impulse response received at the color correcting device by the RAM, for comparing the average of the received GCR signal to a channel estimation result obtained by a computer simulation and compared to a computer simulation in which the Korean Standard GCR signal transmitted from a broadcasting station is passed through a channel having an impulse response estimated in the color distortion correcting device. FIGS. 8a–8d and 9a–9d illustrate results of the simulations for KBS-1 and KBS-2, respectively, with standardized scale.

Figure 8A:
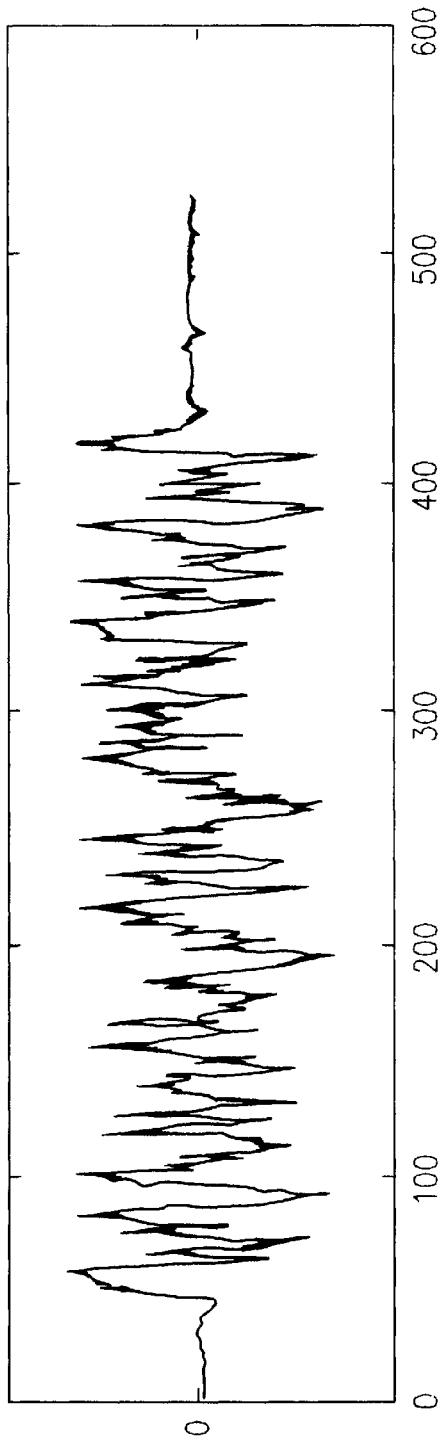
FIGS. 8a and 9a respectively illustrate average waveforms of GCR signals received at devices for correcting a color distortion, FIGS. 8b and 9b respectively illustrate impulse response waveforms of a channel estimated at devices for correcting a color distortion.
Figure 8B:
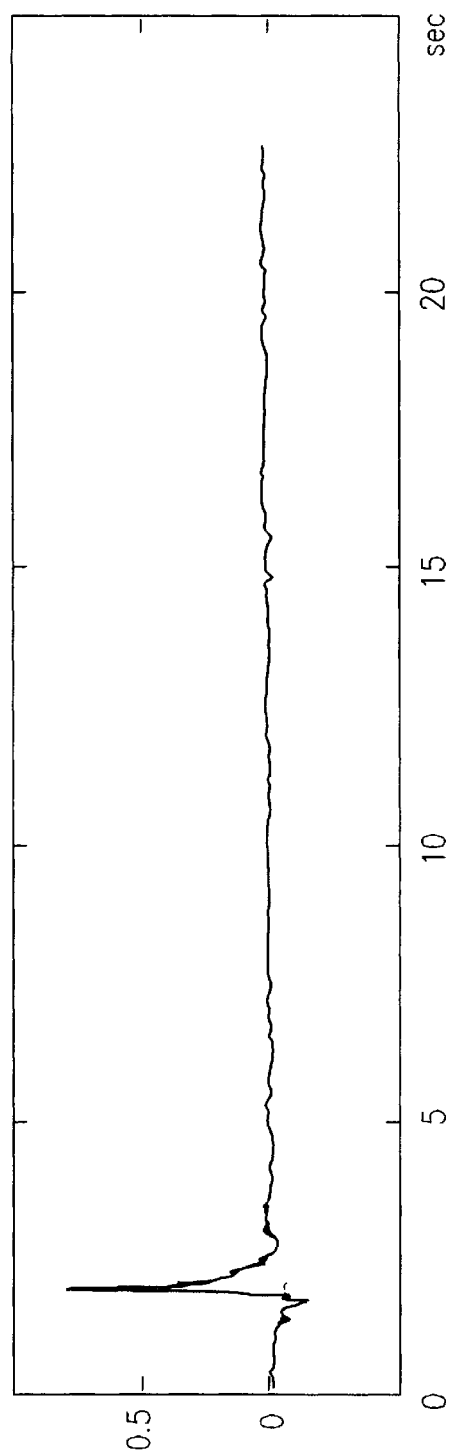
FIGS. 8c and 9c respectively illustrate GCR signals obtained by computer simulations in which a Korean Standard GCR signal of which ternary sequence is bandwidth restricted is passed through a channel having an impulse response estimated in FIGS. 8b and 9b and, FIGS. 8d and 9d respectively illustrate results of computer simulations with data of FIGS. 8a and 9a using an algorithm identical to an estimation algorithm used in a color distortion correcting device.
Figure 8C:
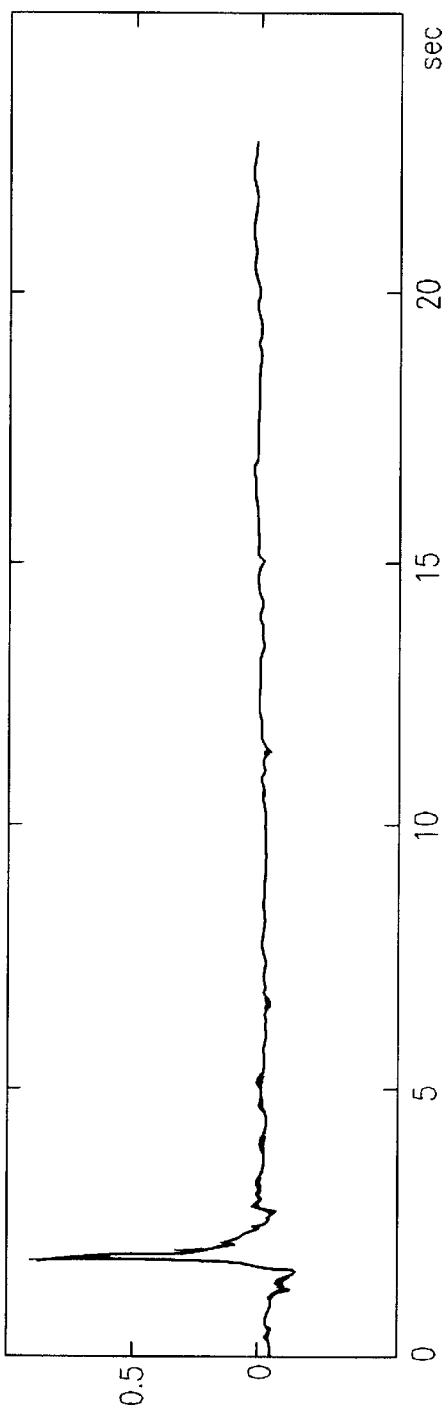
Figure 8D:
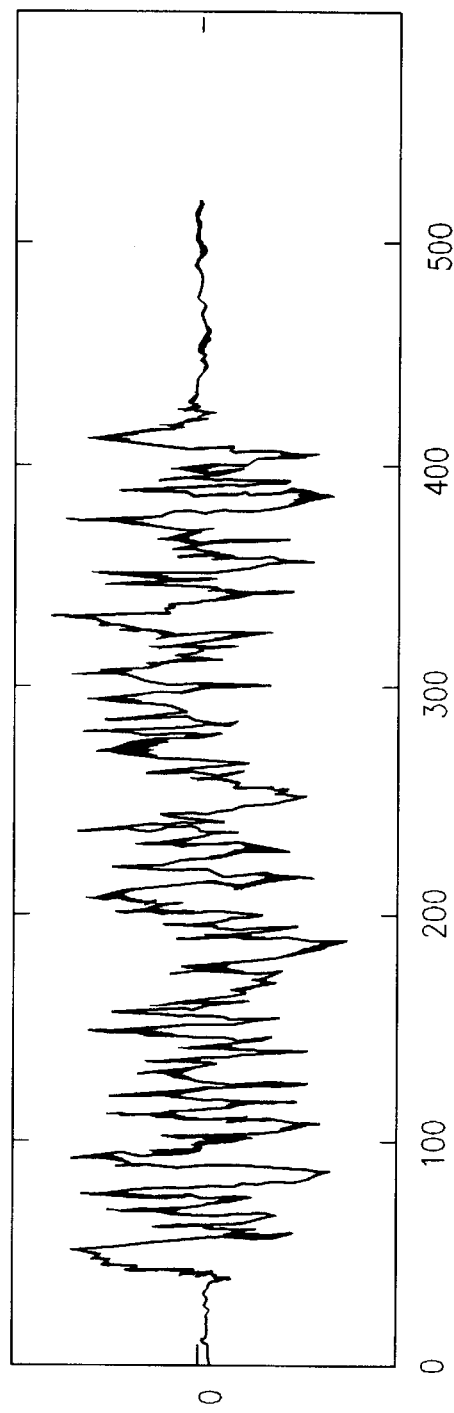
Figure 9A:
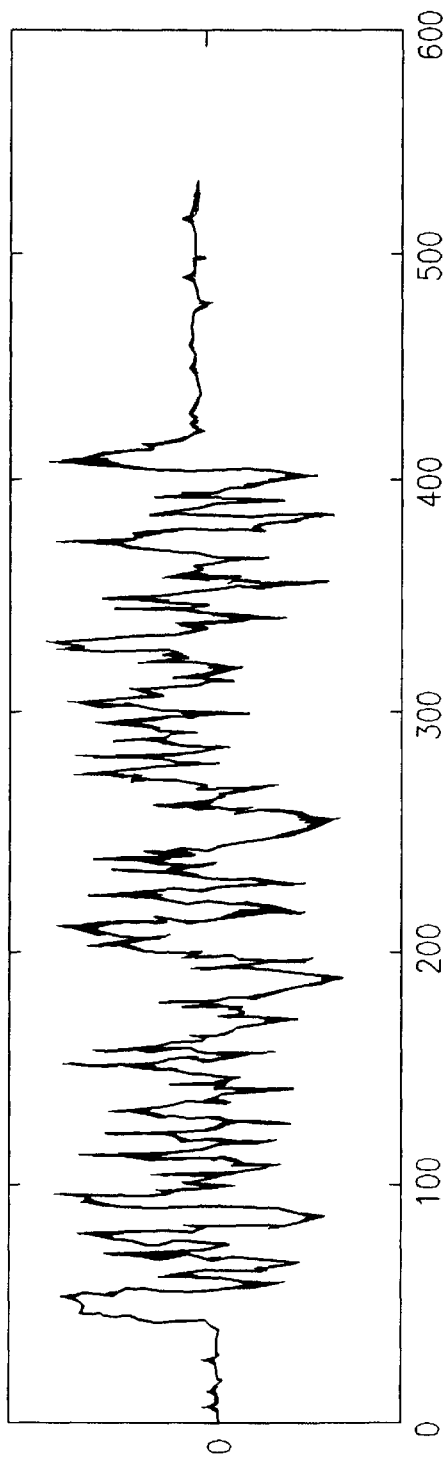
Figure 9B:
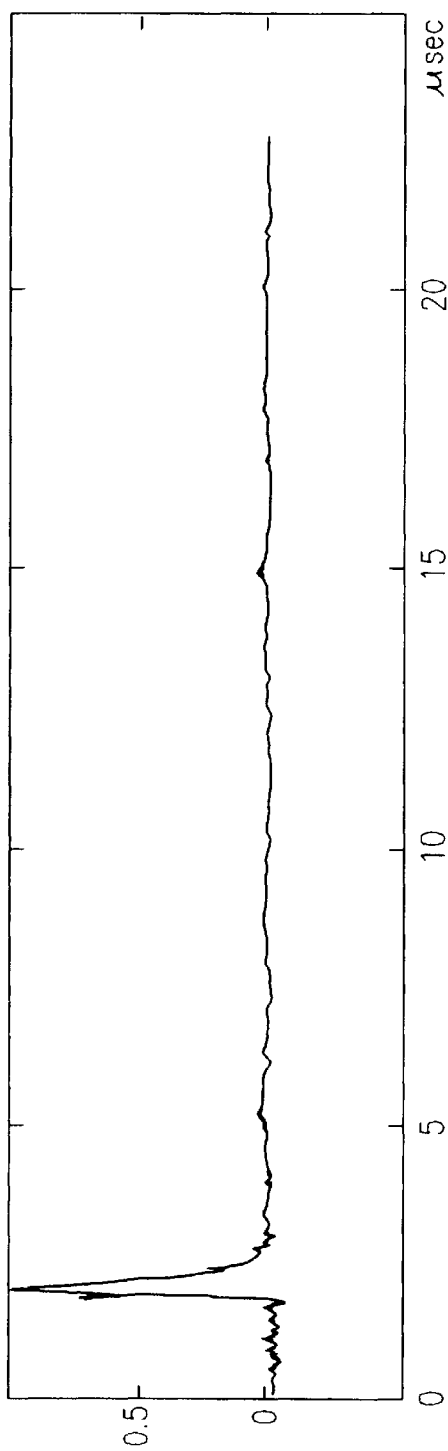
Figure 9C:
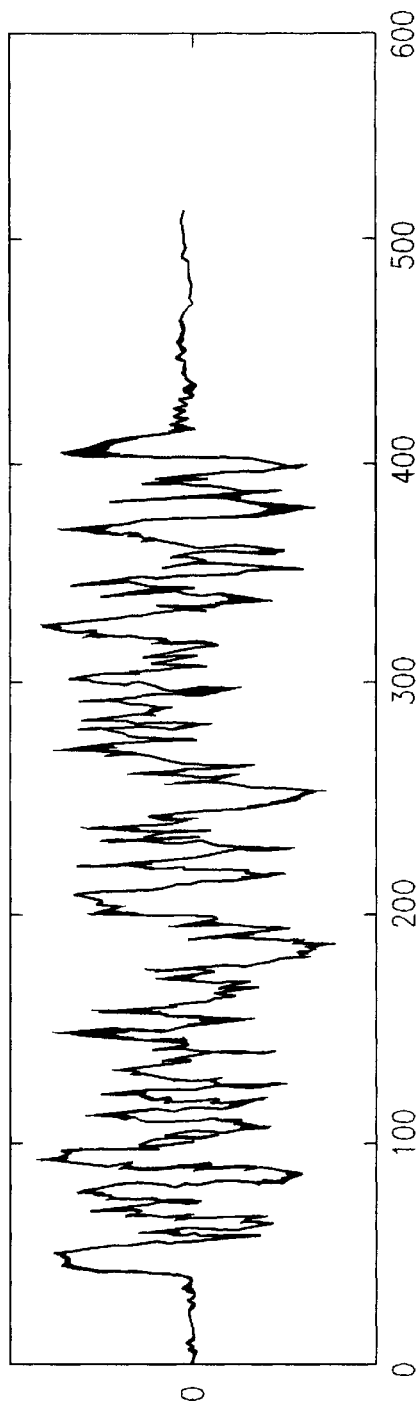
Figure 9D:
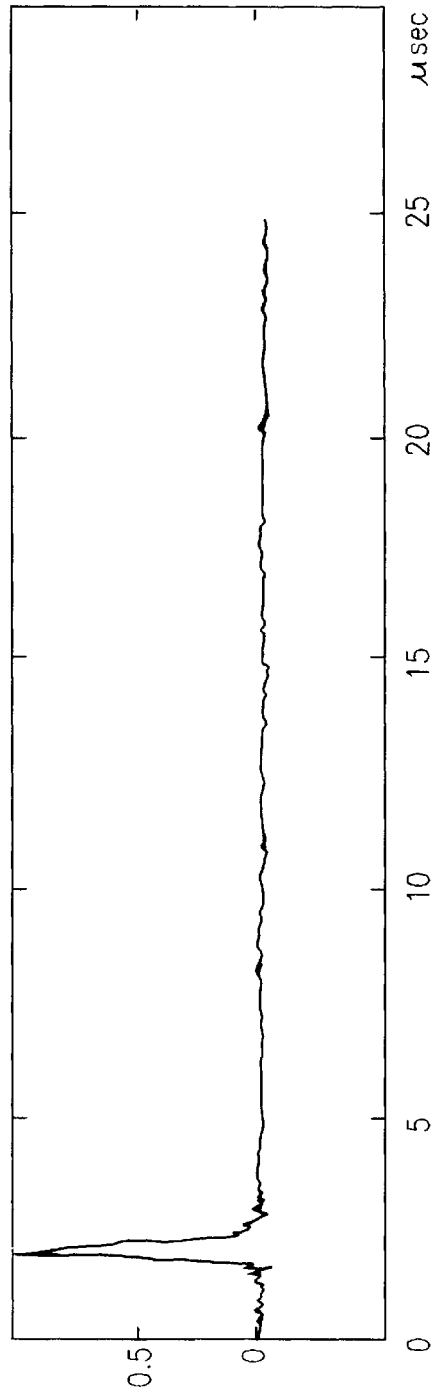

FIGS. 8a and 9a illustrates averages of GCRs received at the device received for 8 times, and FIGS. 8b and 9b illustrate impulse responses of a multi-path channel estimated of data using a ternary sequence and circular auto correlation. FIGS. 8c and 9c respectively illustrate GCR signals obtained by computer simulations in which a Korean Standard GCR signal of which ternary sequence is bandwidth restricted is passed through a channel having an impulse response estimated in FIGS. 8b and 9b, which should be identical to FIGS. 8a and 9a, respectively. FIGS. 8d and 9d respectively illustrate results of computer simulations with data of FIGS. 8a and 9a using an algorithm identical to an estimation algorithm used in a color distortion correcting device, which should be identical to FIGS. 8b and 9b. From this computer simulation, it can be known that a GCR signal reception function of the color distortion correcting device and the channel estimation algorithm are operative normally.

It has been explained that there is a slight difference between a path of the GCR for estimator of a channel and a path of a TV color signal. Therefore, a phase error between color subcarriers in a color signal path and a GCR signal path are measured as an experiment. As a method for measuring this, a ghost generator is used in inserting a standard GCR signal into a main signal which has no delay and a size of unity, and a color distortion correcting device receives the signal and estimates a channel. As a result of calculation of a phase error from the estimated impulse response, it is found that the phase difference due to the transmission paths of the two signals has a range of error of 27°33°, which is an error coming from the color distortion connecting device. Therefore, for calculating an actual phase error, values within a range of 27°–33° should be made to be reflected well. According to phase error calculations for broadcasting signal transmission channels of KBS-1 and KBS-2 illustrated in FIGS. 8a–8d and 9a–9d, the phase error in the case of KBS-1 broadcasting is approx. 53° and the phase error in the case of KBS-2 broadcasting is approx. 18°. When an error occurred by the color distortion correcting device is taken into account in addition to this calculated value, an actual phase error will be approx. 20° and –8°, respectively. This is a result of experiment for a signal transmitted from a main broadcasting station, and the same for local broadcasting stations of KBS give different error values. If it is found that any local broadcasting station has a phase error smaller than the above result, the calculated error value is the value that should be reflected well in an actual phase error calculation expressed in equation (20).

Different from the background art ghost canceling device in which the signal processing microcomputers 66 and 67 and the transverse filter are used, the system of the present invention includes the A/D converter 61, the buffer 62, the tuning generator 65 and the like, added to a controlling microprocessor used in a general TV receiver. Therefore, requirements for color distortion due to TV signal transmission paths are increased and design technologies of a microprocessor are further improved, major components of a color distortion correcting device can be embodied as a simple microprocessor in a form of a caption processing microprocessor used, currently. That is, the reference signal detecting part 60A, the controlling part 60B and the timing generator 65 can be embodied into a single mircoprocessor using a microprocessor design technology.

As has been explained, the present invention has advantages in that, in the case of Korean Standard GCR signal is used, a calculation for estimating an impulse response of a multi-path channel can be conducted with easy, not using a multiplier, but using an adder only utilizing a characteristic of ternary sequence, which is a GCR signal, and in that a phase response of a color subcarrier can be obtained with a simple calculation from the estimated impulse response. Accordingly, the method and device for correcting a color distortion on a TV receiver of the present invention have an advantage that the device and method of the present invention can be embodied into an actual product with easy by adding a simple timing circuit and a buffer, which are required for obtaining GCR signals, not using a signal processing microprocessor like the one used in a general ghost canceler, but using a microprocessor used in an existing TV receiver.

It will be apparent to those skilled in the art that various modifications and variations can be made in the device and method for correcting a color distortion on a TV receiver of the present invention without departing from the spirit or scope of the invention. Thus, it is intended that the present invention cover the modifications and variations of this invention provided they come within the scope of the appended claims and their equivalents.

What is claimed is:

1. A method for correcting a color distortion on a TV receiver, comprising:

a multi-path channel estimation step wherein a transmission channel existing between a transmitter side in a broadcasting station and a color demodulating circuit in a TV receiver is estimated for obtaining an impulse response using a reference signal transmitted from the broadcasting station for equalizing a multi-path channel;

a color subcarrier phase error calculation step wherein a phase error of a color subcarrier between the transmitter side of the broadcasting station and the TV receiver is calculated using the estimated impulse response; and, a phase correction of a reproduced color subcarrier step wherein a phase error on the TV receiver in reproduction of a color is corrected as much as the phase error obtained in the color subcarrier phase error calculation step.

2. A method for correcting a color distortion on a TV receiver, comprising:

a reference signal detection step for repeatedly reading and storing a reference signal transmitted from a broadcasting station for use in equalizing a multi-path channel;

an averaging step for obtaining an average of stored reference signals;

a step for estimating an impulse response of a multi-path channel from the average;

a step for calculating a phase error of a received color signal from the impulse response; and, a color signal correcting step for generating a color signal correcting value from the phase error.

3. A method as claimed in claim 2, wherein the color signal correcting step includes a step for determining presence of the reference signal.

4. A method as claimed in claim 2, further comprising an interval aligning step for estimating an impulse response aligning an interval such that maximum values always fall on the same point after the step for estimating an impulse response.

5. A device for correcting a color distortion on a TV receiver, comprising:

reference signal detecting means for detecting a GCR signal inserted in a received video signal;

timing control signal generating means for receiving a synchronizing signal from synchronization separating means and generating a timing control signal for detecting the GCR signal;

control means for receiving the GCR signal from the reference signal detecting means, calculating a color subcarrier error between a transmitter side in a broadcasting station and a TV receiver caused by multi-paths in a channel, and generating a color signal correcting data as much as the calculated error; and, color signal demodulating means for receiving the correcting data from the control means and correcting a color signal.

6. A device as claimed in claim 5, wherein the GCR signal is a GCR signal for equalizing a multi-path channel.

7. A device as claimed in claim 5, wherein the reference signal detecting means includes an A/D converter and a memory means for digitizing and storing a received signal.

8. A device as claimed in claim 5, wherein the reference signal detecting means includes, an A/D converter for digitizing a received signal, a reference signal buffer for buffering the digitized signal, and a RAM for reading an output of the reference signal buffer by means of the control means.

9. A device as claimed in claim 8, wherein the reference signal buffer includes an FIFO.

10. A device as claimed in claim 5, wherein the reference signal detecting means, the control means and the timing control signal generating means are integrated into a chip.

* * * * *